Figure 1:
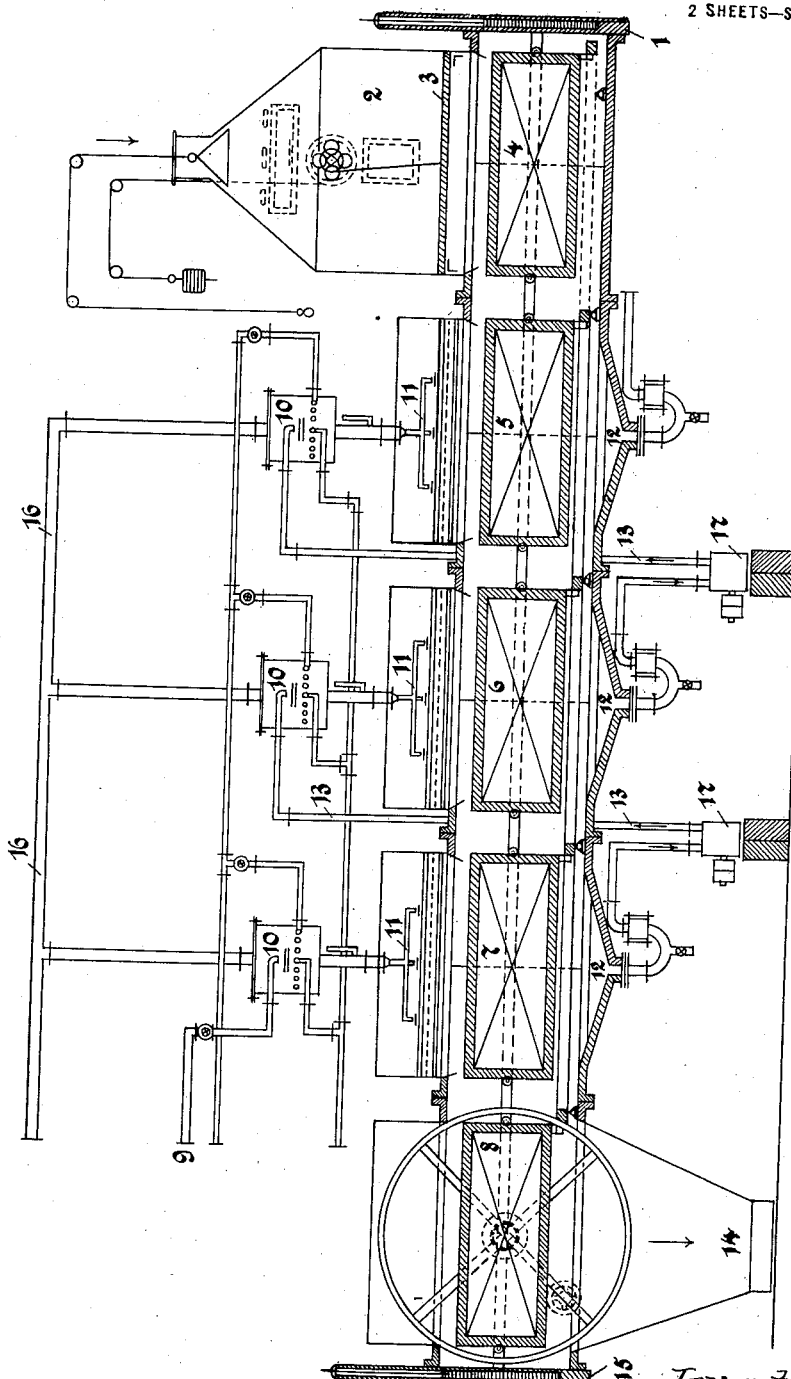

H. BOLLMANN.
EXTRACTION OF FAT AND OIL FROM RAW MATERIALS.
APPLICATION FILED JUNE 22, 1920.

1,411,154. Patented Mar. 28, 1922.
2 SHEETS—SHEET 1.

Inventor
Hermann Bollmann
by A. B. Foster, Atty

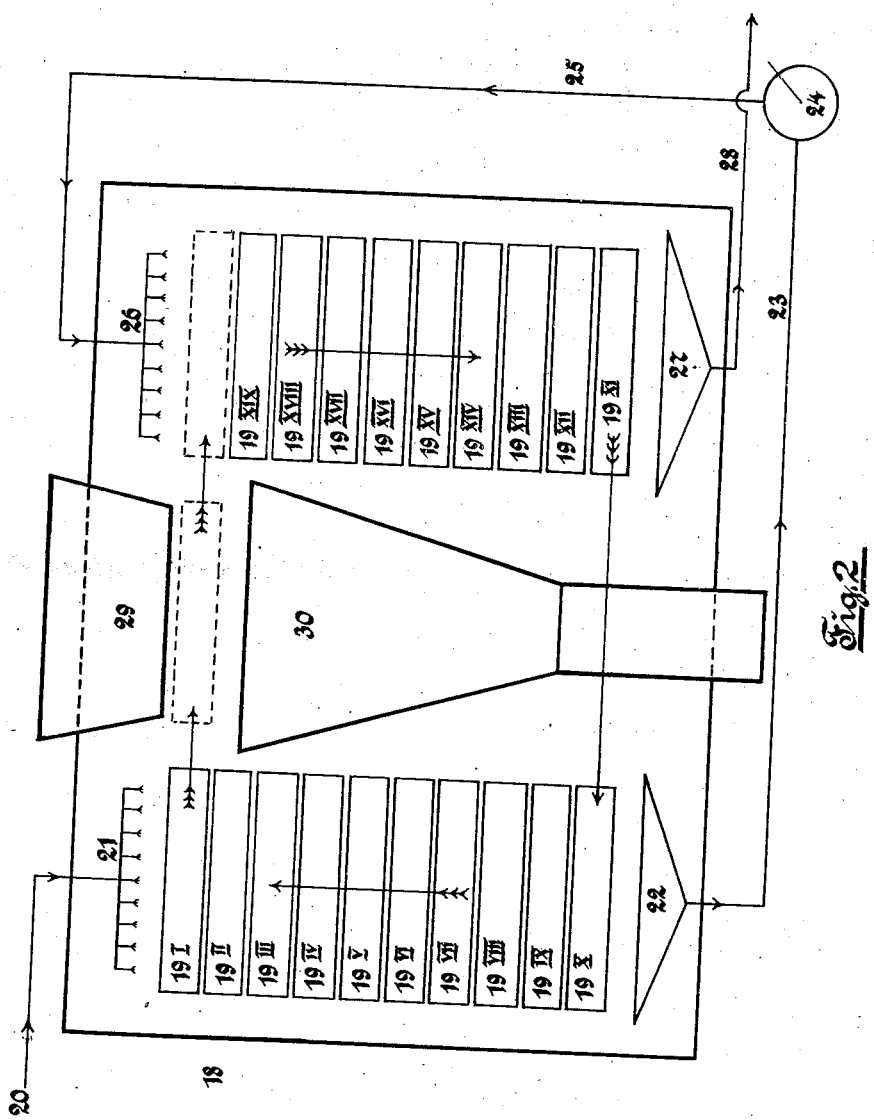

UNITED STATES PATENT OFFICE.

HERMANN BOLLMANN, OF HAMBURG, GERMANY.

EXTRACTION OF FAT AND OIL FROM RAW MATERIALS.

1,411,154.

Specification of Letters Patent. Patented Mar. 28, 1922.

Application filed June 22, 1920. Serial No. 390,951.

*To all whom it may concern:*

Be it known that I, HERMANN BOLLMANN, a citizen of Hamburg, Germany, residing at Hamburg and State of Germany, have invented certain new and useful Improvements in or Relating to the Extraction of Fat or Oil from Raw Materials, (for which I have filed applications in Germany Sept. 17, 1916; Germany May 29, 1918; Germany Aug. 9, 1918; Belgium June 7, 1919; Netherlands April 17, 1919; Hungary April 19, 1919; Denmark April 25, 1919; Norway June 13, 1919; Austria April 18, 1919; Sweden May 3, 1919; Switzerland Apr. 17, 1919; Czechoslovakia April 28, 1919,) of which the following is a specification.

This invention relates to a process by means of which fat or oil may be gradually recovered from raw materials such as seed embryos, or resins from vegetable substances, Montan wax from brown coal or other substances from raw materials and in which for this purpose the solvent is conveyed through the materials under extraction in countercurrent.

In the known processes of this kind the raw material is subjected in a closed chamber to one single treatment with the solvent, and the solvent is conveyed by way of piping successively through separate closed receptacles containing the raw material. It has also been proposed in methods for fractional sweating out, of melting substances from raw material with the aid of heated air, to convey this in open receptacles into a closed apparatus in opposition to the air current.

In contra-distinction to these known methods, the present invention consists in conveying the raw material as separated batches in receptacles provided with sieve-like bottoms and open at the top within the closed chamber in one direction, and to cause the solvent to travel freely in the opposite direction consecutively through all receptacles whereby the fat content of the solvent is progressively increased. This has the advantage of enabling loss of solvent to be avoided more efficiently and the passage thereof through the material under extraction to be effected within the closed chamber from which the solvent vapours may be recovered and after condensation may again be utilized.

Moreover, the heat employed in the process is more effectively utilized because it is made to act on the whole of the arrangement within the closed chamber in which the complete process is carried out.

The process may moreover be carried out in such a manner while in contact that the raw material contained in the receptacle is moved with the receptacles in the chamber not forwardly or in a horizontal direction but first of all in a downwardly direction and then in an upward direction, whereas the solvent is conveyed in the opposite direction only through the material of the upwardly moving receptacles and in the same direction through the material in the downwardly moving receptacles. In this manner it is likewise possible to attain a gradual or stepwise extraction of the fat from the raw material and proportion of the fat contained in the solvent will increase from receptacle to receptacle. The process has, in addition, the advantage that the apparatus for carrying it into effect occupies a relatively small area and that the solvent need only once be pumped so that smaller quantities of the solvent are required for performing the operation. In addition thereto the receptacles after being emptied need not be removed from the chamber before their re-introduction into the working.

Figure 1 of the annexed drawings illustrates an apparatus for use in a closed chamber. The open receptacles 4, 5, 6, 7, and 8 which may be of any desired number, are adapted to receive the material to be extracted, and are provided with sieve bottoms and by means of rollers are adapted to run on rails. They are inserted in the chamber by way of a sliding gate 1, and are introduced into the working after being filled from the hopper 2 which contains the raw material and is provided with a removable bottom.

The solvent which is supplied by way of a conduit 9 and heated by means of heating devices 10 trickles into the can of a distributor device 11 in the form of a fine spray on to the material contained in receptacle 7, and after being collected in the receptacle 12 located thereunder is conveyed through the pipes 13 by means of the pump 17 successively on to the material contained in the receptacles 6 and 5. After the solvent thus enriched with fat has traversed the last receptacle to be supplied with raw material, and introduced into the process, it is separated and freed from the extracted fat by distillation, and the solvent is then re-introduced into the process. The vapours of the solvent employed in the chamber are removed, through pipes 16, condensed, and reintroduced into the chamber. The receptacle 8 which has traversed the whole of the process is discharged by a tipping action with the aid of a turntable into the pit 14 and thereafter removed from the chamber through the door 15. The remaining receptacles, with the material to be extracted or already more or less extracted are then caused to advance into new positions by means of a push rod from the outside, and, an empty container re-introduced into the chamber.

In this manner the raw material is conveyed in opposition to the solvent by means of a portable container so that the fresh solvent introduced into the process is caused to pass first through the material previously lixiviated which is thereby completely free from fat and withdrawn from treatment with the solvent, while the fat content of the solvent is progressively enriched from receptacle to receptacle, according to the amount of fat contained in the raw material. After traversing the receptacle last supplied with fresh material the solvent is removed for further treatment.

Figure 2 of the annexed drawings illustrates the apparatus for carrying the process into effect wherein the raw material contained in the receptacles is first moved in a downward and then in an upward direction.

Arranged in the chamber 18 are receptacles $19^I$ to $19^{XIX}$ which are moved in the chamber in a cycle in the direction indicated by arrows. The solvent which is supplied by way of a conduit 20 first reaches the distributor 21 and then trickles through the material contained in the receptacles $19^I$ to $19^X$. The extract thus obtained is trapped in a collecting basin 22 whence it is pumped by means of a pump 24 through pipes 23 and 25 into the distributor 26. From the latter the liquid trickles through the material in containers $19^{XIX}$ to $19^{XI}$ and withdrawn through the collection receptacle 27 and pipe 28.

The receptacle $19^I$ which was first put into operation, is then brought over the pit 30, discharged into the latter and then recharged from the filling chamber 29, after which it is slid over the receptacle $19^{XIX}$ and thereby reintroduced into the process. The receptacles $19^X$ to $19^{II}$ are moved upwardly, the receptacle $19^{XI}$ takes the place of the receptacle $19^X$, and the receptacles $19^{XIX}$ to $19^{XII}$ are then moved in a downward direction and so on.

I claim:—

1. A process of extracting material to separate the soluble part from the insoluble part, which comprises providing a series of batches of the same material successively richer in the soluble constituent, percolating a solvent through each of such batches, a part of such solvent treatment being successively in the order of increasing richness of the said material, and a part of such treatment being in the reverse order, withdrawing batches of extracted material and adding batches of unleached material, while intermittently moving the partly extracted batches of material toward the incoming solvent, and maintaining the said batches separate from each other during the said treatment.

2. A process of extracting material to separate the soluble part from the insoluble part, which comprises providing a series of batches of the same material successively richer in the soluble constituent, percolating a solvent through each of such batches, a part of such solvent treatment being successively in the order of increasing richness of the said material, and a part of such treatment being in the reverse order, withdrawing batches of extracted material and adding batches of unleached material, while intermittently moving the partly extracted batches of material toward the incoming solvent, and maintaining the said batches separate from each other during the said treatment, all while moving the batches already largely extracted material contra to the direction of flow of the liquid in contact therewith, and while moving the batches which have had only slight extraction in the same direction as the liquid in contact therewith.

3. A process of extracting material to separate the soluble part from the insoluble part, which comprises providing a series of batches of the same material successively richer in the soluble constituent, percolating a solvent through each of such batches, a part of such solvent treatment being successively in the order of increasing richness of the said material, and a part of such treatment being in the reverse order, withdrawing batches of extracted material and adding batches of unleached material, while intermittently moving the partly extracted batches of material toward the incoming solvent, and maintaining the said batches separate from each other during the said treatment, while elevating a part of the batches of material which have been largely extracted, and while lowering another part of the batches of material which have been less extensively extracted, while flowing the solvent downwardly through both of said sets of batches.

In testimony whereof I affix my signature.

HERMANN BOLLMANN.